(12) United States Patent
Yilmaz et al.

(10) Patent No.: US 12,556,488 B2
(45) Date of Patent: Feb. 17, 2026

(54) NETWORK TRAFFIC ARBITRATION BASED ON PACKET PRIORITY

(71) Applicant: Microsoft Technology Licensing, LLC, Redmond, WA (US)

(72) Inventors: Yalcin Yilmaz, Sunnyvale, CA (US); Monica Man Kay Tang, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 89 days.

(21) Appl. No.: 18/391,193

(22) Filed: Dec. 20, 2023

(65) Prior Publication Data
US 2025/0211545 A1 Jun. 26, 2025

(51) Int. Cl.
*H04L 47/6275* (2022.01)
*H04L 47/62* (2022.01)

(52) U.S. Cl.
CPC ........ *H04L 47/6275* (2013.01); *H04L 47/623* (2013.01)

(58) Field of Classification Search
CPC .......................... H04L 47/6275; H04L 47/623
See application file for complete search history.

(56) References Cited

U.S. PATENT DOCUMENTS

| | | | | |
|---|---|---|---|---|
| 7,171,683 B2* | 1/2007 | Pazi | ...................... | H04L 63/164 |
| | | | | 709/224 |
| 2019/0238453 A1* | 8/2019 | Swarbrick | ............... | H04L 67/34 |
| 2023/0205449 A1* | 6/2023 | Jeong | .................. | G06F 12/0246 |
| | | | | 711/118 |
| 2024/0163223 A1* | 5/2024 | Liew | .................... | H04L 49/109 |

OTHER PUBLICATIONS

Sikder, Ashif Iqbal, "Emerging Technologies in On-Chip and O-Chip Interconnection Network," Aug. 2016, pp. 1-81.
Tsai, et al., "Networks on Chips: Structure and Design Methodologies," Journal of Electrical and Computer Engineering, vol. 2012, pp. 1-16.
Zhou, et al., "PCCNoC: Packet Connected Circuit as Network on Chip for High Throughput and Low Latency SoCs," Micromachines, vol. 14, No. 3, Feb. 21, 2023, 21 pages.
Zogh, et al., "Investigating and Analyzing the Effect of Router Components on Network Performance on the Chip with Regard to Power Consumption," Majlesi Journal of Telecommunication Devices, vol. 7, No. 4, Dec. 2018, pp. 179-183.

* cited by examiner

*Primary Examiner* — Joshua D Taylor
(74) *Attorney, Agent, or Firm* — Alleman Hall LLP

(57) ABSTRACT

A method for network traffic arbitration includes, at a network router, receiving two or more network packets over two or more input ports. During an observation window, traffic parameters for the two or more network packets are stored in a traffic history table, the traffic parameters including a Quality-of-Service (QOS) priority value for a network packet of the two or more network packets. Based at least in part on the traffic parameters recorded in the traffic history table, including the QoS priority value, arbitration weights are calculated for each of the two or more input ports for a weighted round robin arbitration process.

20 Claims, 6 Drawing Sheets

200 ↘

```
┌─────────────────────────────────────────────────────┐
│ RECEIVE TWO OR MORE NETWORK PACKETS OVER TWO        │
│              OR MORE INPUT PORTS                    │
│                                                 202 │
└─────────────────────────────────────────────────────┘
                          │
                          ▼
┌─────────────────────────────────────────────────────┐
│ DURING AN OBSERVATION WINDOW, RECORD TRAFFIC        │
│ PARAMETERS OF THE NETWORK PACKETS IN A TRAFFIC      │
│               HISTORY TABLE                     204 │
└─────────────────────────────────────────────────────┘
                          │
                          ▼
┌─────────────────────────────────────────────────────┐
│ CALCULATE ARBITRATION WEIGHTS FOR THE TWO OR        │
│ MORE INPUT PORTS BASED AT LEAST IN PART ON THE      │
│              TRAFFIC PARAMETERS                 206 │
└─────────────────────────────────────────────────────┘
                          │
                          ▼
┌─────────────────────────────────────────────────────┐
│ SEQUENTIALLY TRANSMIT THE NETWORK PACKETS OVER      │
│     AN OUTPUT PORT OF THE NETWORK ROUTER        208 │
└─────────────────────────────────────────────────────┘
```

FIG. 2

NETWORK TRAFFIC ARBITRATION BASED ON PACKET PRIORITY

BACKGROUND

Network routers are used to direct and manage the flow of data between different networks, ensuring efficient and accurate transmission of information. One aspect of router functionality is traffic arbitration, which involves managing the flow of data packets within the router to ensure equitable sharing of network resources. Traffic arbitration may serve to prioritize traffic based on factors such as packet type, source, and/or destination. Effective traffic arbitration can serve to prevent network congestion, optimize bandwidth utilization, and maintain the overall integrity and performance of the network.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for network traffic arbitration includes, at a network router, receiving two or more network packets over two or more input ports. During an observation window, traffic parameters for the two or more network packets are stored in a traffic history table, the traffic parameters including a Quality-of-Service (QOS) priority value for a network packet of the two or more network packets. Based at least in part on the traffic parameters recorded in the traffic history table, including the QoS priority value, arbitration weights are calculated for each of the two or more input ports for a weighted round robin arbitration process.

BRIEF DESCRIPTION OF THE DRAWINGS

FIG. 2 illustrates an example method for network traffic arbitration.

DETAILED DESCRIPTION

Figure 1:
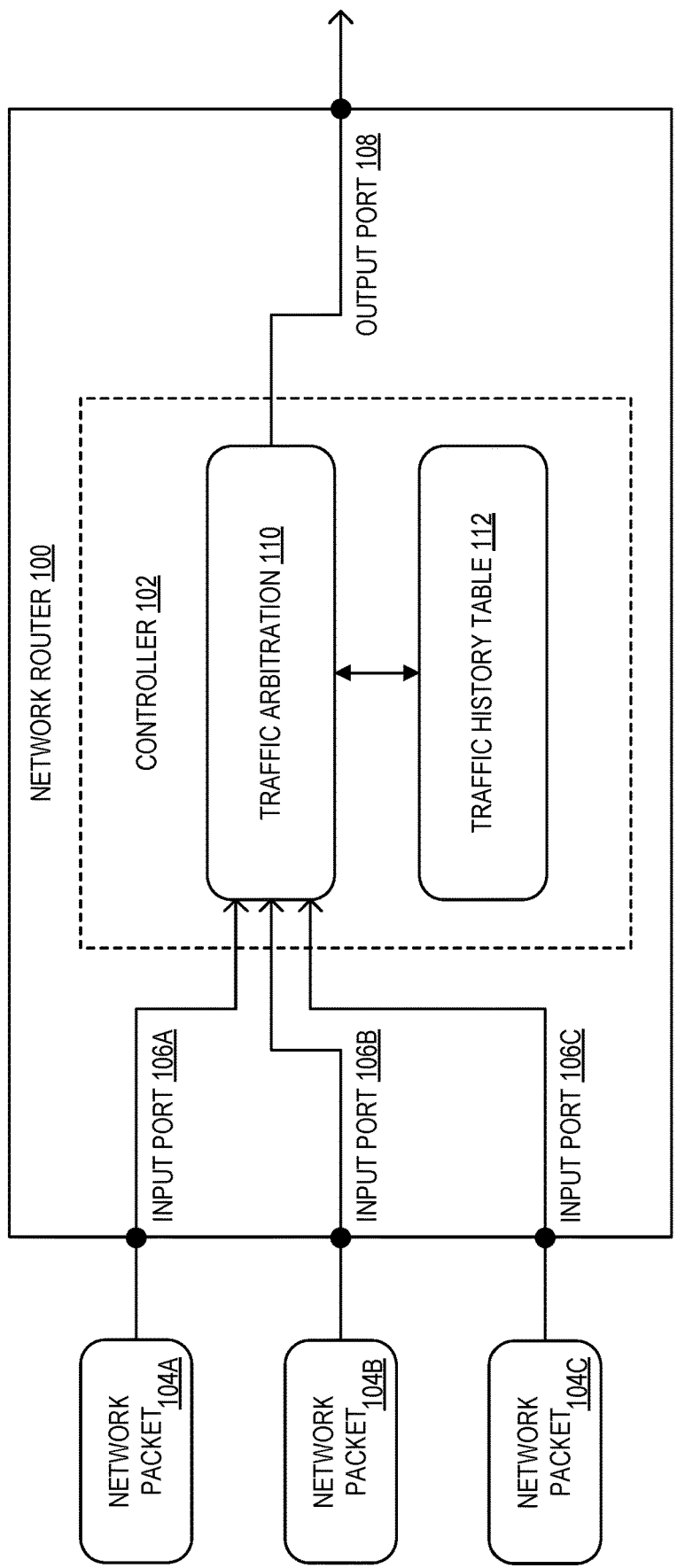
FIG. 1 schematically illustrates the operation of an example network router.

In some approaches, traffic arbitration at a network router is done on a weighted round robin (WRR) basis. In this framework, network traffic originating from different sources (e.g., different input ports) is divided into distinct categories or queues, each associated with a different arbitration weight value as determined by various factors. These queues are then serviced in a round-robin fashion, where each queue is allocated network resources-such as transmission over an output port-in proportion to its assigned arbitration weight. This weighting mechanism allows higher-priority traffic to receive more frequent servicing, thereby ensuring that higher-priority traffic streams are maintained effectively.

In one example scenario, for a WRR approach, one input port A is assigned a relatively high weight of 5, while another input port B is assigned the relatively lower weight of 1. Over a series of cycles, one packet from port A is transmitted over the output port, then one packet from port B is transmitted over the output port, then over the next 4 cycles, additional packets from port A are transmitted. In other words, according to this approach, the system initially rotates between each input port, although higher-weighted input ports are still provided with more access to the output port. This is different to another approach where, for instance, traffic from port A is transmitted during the first 5 cycles, and then a sixth cycle is used for port B.

In some cases, this WRR approach features an expedited handling process for packets classified with relatively high Quality-of-Service (QOS) priority values. These packets, often associated with latency-sensitive applications like streaming media or real-time communications, may be granted an express pathway, bypassing the standard WRR queueing. For instance, upon detection, such high-priority packets may be transmitted immediately to thereby reduce delay and latency for the high-priority stream.

However, while such handling of high-priority packets effectively caters to time-sensitive traffic, it can undesirably affect transmission of lower-priority traffic. For instance, in scenarios where high-priority traffic is frequent or constant, lower-priority packets may experience extended delays or even complete neglect as they are superseded by high-priority traffic. This situation can lead to suboptimal network utilization and diminished service quality for less critical applications, a concern particularly relevant in networks with diverse and fluctuating traffic patterns.

As such, the present disclosure is directed to techniques for network traffic arbitration, where the arbitration weight calculated for a network packet is based at least in part on a QoS priority value for the packet. A QoS priority value may be assigned by an earlier network entity (e.g., an earlier router, or the original source device of the packet). A QoS priority value is a numerical representation of the relative priority of the network packet—e.g., relatively higher priority values may correspond to higher priority packets. In some examples, QoS values range between 0 and 7. Network packets are received at a network router via two or more input ports. During an observation window, traffic parameters for the network packets are recorded in a traffic history table, including the QoS priority value for at least one network packet. After this observation period, the system calculates arbitration weights for each input port based at least in part on the QoS priority value.

In this manner, the techniques described herein beneficially preserve prioritization of high-priority traffic, ensuring that packets with higher QoS values continue to receive expedited handling. However, the present disclosure additionally enables lower-priority traffic to still be transmitted as part of the WRR arbitration process, mitigating the risk that such traffic is starved for a significant period of time. Thus, the techniques described herein balance the prompt servicing of high-priority packets against the equitable transmission of lower-priority traffic, thereby improving network performance and enhancing overall traffic management.

FIG. 1 schematically shows an example network router 100. In general, a network router is a device used for directing and managing the flow of data packets between computers or different networks. Network routers may operate by analyzing the destination address of each data packet, and determining the most efficient path for each packet to travel relative to the underlying physical and/or virtual network topology. Routers manage network traffic, prioritize data packets based on predefined rules or protocols, and can also provide security functions like firewall protection. Additionally, routers play a role in maintaining network integrity, preventing data collisions, and ensuring reliable and efficient communication across interconnected networks. Network routers are implemented via any suitable combination of hardware, software, and/or firmware. As one example, a network router may be implemented as computing system 600 described below with respect to FIG. 6.

It will be understood that the specific configuration depicted in FIG. 1 is non-limiting. For instance, as will be described in more detail below, a "traffic history table" may in some cases be maintained by one or more other computing devices instead of, or in addition to, a network router. Furthermore, in some examples, network packets may be monitored prior to such packets being received at the network router—e.g., by other suitable devices in the network environment.

As shown, network router 100 includes controller 102. A "controller," as used herein, refers to any suitable computer logic component, or combination of such components, usable to execute instructions and perform the traffic arbitration functions described herein. For instance, controller 102 may include a computer processor or application-specific integrated circuit (ASIC). In some examples, controller 102 may be implemented as logic subsystem 602 described below with respect to FIG. 6.

For the purposes of the present disclosure, a network router receives two or more network packets via two or more different input ports of the router. Traffic arbitration is then performed to determine the relative priority with which traffic originating from these network ports is transmitted via an output port of the network router. In the example of FIG. 1, network router 100 receives three different network packets 104A, 104B, and 104C via respective input ports 106A, 106B, and 106C of network router 100. It will be understood that this is non-limiting, and that a network router may receive any suitable number of network packets over any suitable number of different input ports.

Network packets refer to units of computer data transmitted across a network. Each packet typically includes two primary components: the header and the payload. The header of a network packet may include information pertinent to routing and delivering the packet to its intended destination. This may include the source and destination IP addresses, which identify the sending and receiving devices, respectively. The header may also include protocol information, indicating the type of data being sent (such as TCP, UDP, ICMP, etc.), and/or other control information. The payload includes the actual data being transmitted. This can vary widely in content and size, depending on the application and the type of network. For example, the payload could contain a segment of a web page, a piece of an email message, streaming video data, or voice in a VoIP conversation. According to the techniques described herein, network packets additionally include QoS priority values, which are used to determine how the packets should be prioritized and handled.

As will be described in more detail below, traffic arbitration is performed by network router 100 to determine how to equitably transmit each of the received network packets over an output port 108. To this end, controller 102 performs a traffic arbitration process 110 based at least in part on data stored in a traffic history table 112. For instance, arbitration weights may be calculated for each of the input ports according to QoS priority values of the network packets, which may be used to determine an order or sequence with which the network packets will be transmitted over the output port.

To this end, FIG. 2 illustrates an example method 200 for network traffic arbitration. Method 200 is primarily described as being performed by a controller of a network router. However, it will be understood that method 200 may be performed by any suitable computing system of one or more computing devices. Any computing device performing steps of method 200 may have any suitable capabilities, hardware configuration, and form factor. Steps of method 200 may be initiated, terminated, and/or repeated at any suitable time and in response to any suitable trigger. In some examples, method 200 may be implemented by computing system 600 described below with respect to FIG. 6.

At 202, method 200 includes receiving two or more network packets over two or more input ports of a network router. This may be done substantially as described above with respect to FIG. 1. As discussed above, a network router may receive any suitable number of different network packets over any suitable number of different input ports. Each network packet may be formatted and encoded in any suitable way, and may include any suitable data.

At 204, method 200 includes, during an observation window, recording traffic parameters of the two or more network packets in a traffic history table. The observation window refers to a period of time during which network packets are received, and traffic parameters for the network packets are recorded. As will be described in more detail below, arbitration weights for the different input ports are in some cases calculated after completion of the observation window. It will be understood that the observation window may have any suitable length depending on the implementation. In some examples, the length of the observation window is dynamically configurable.

Figure 3:
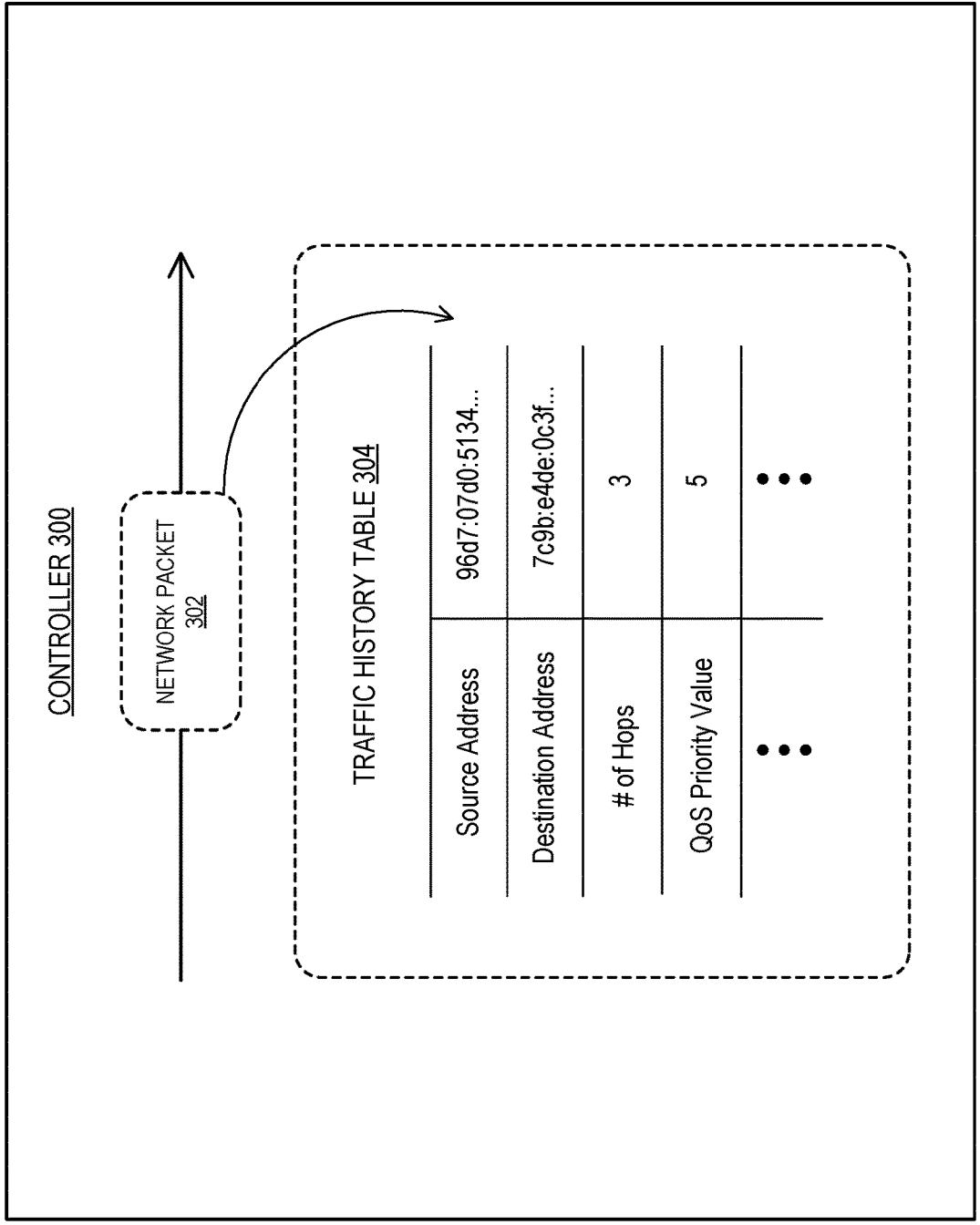
FIG. 3 schematically illustrates recording traffic parameters in a traffic history table.

FIG. 3 schematically illustrates a controller of a network router recording traffic parameters for a network packet. Specifically, FIG. 3 schematically shows another example controller 300 of a network router. In this example, the network router has received a network packet 302 via an input port. Traffic parameters for the network packet are recorded in a traffic history table 304 maintained by controller 300. It will be understood that the traffic history table may include any suitable information pertaining to any or all of the network packets received during the observation window, and that such information may be organized and encoded in any suitable way. Furthermore, it will be understood that the specific information shown in FIG. 3 is non-limiting and provided only for the sake of explanation, and is not intended to correspond to any real device configuration or network environment. In particular, the present disclosure refers to source and destination "addresses," although this is non-limiting. For instance, in some cases, the network source and destination are distinguished by suitable identifiers other than network addresses.

According to the techniques described herein, the traffic parameters include a QoS priority value for a network packet of the two or more network packets. The present disclosure focuses on scenarios where at least one network packet of the packets received during the observation window includes a QoS priority value. It will be understood that any or all packets received during the observation window may include such QoS priority values. For instance, in one example, only one network packet of the received network packets includes a QoS value. In another example, every network packet received during the observation window includes a QoS value. Each QoS priority value may take any suitable form. In some implementations, QoS values range between one and seven, with seven being the highest priority.

It will be understood that any suitable information may be recorded in the traffic history table in addition to the QoS priority value. For instance, in some examples, the traffic parameters stored in the traffic history table further include a source address for each network packet, a destination address for each network packet, and a number of network hops traveled by the network packet. This is the case in FIG. 3. While FIG. 3 only shows such information being recorded for a single network packet, it will be understood that this is non-limiting-rather, traffic history parameters may be recorded for any or all network packets received by the network router during the observation window.

The following pseudocode describes one example approach to recording traffic parameters in a traffic history table. This pseudocode is for processing incoming packets in a network routing context, where there are multiple output ports, virtual channels (VCs), and input ports. It updates the history table for each combination of output port, input port, and virtual channel based on the properties of incoming packets.

for o in range(numOutports):
  for v in range(numVC):
    for i in range(numInports):
      if(inPacket.priority>history [o][i][v]['priority']):
        history [o][i][v]['priority']=inPacket.priority The outer loops iterate over all output ports (numOutports), virtual channels (numVC), and input ports (numInports). If the priority of the incoming packet (inPacket.priority) is higher than the maximum priority recorded so far in the history for the current output port, input port, and virtual channel, the history is updated with this new higher priority.

Figure 4:
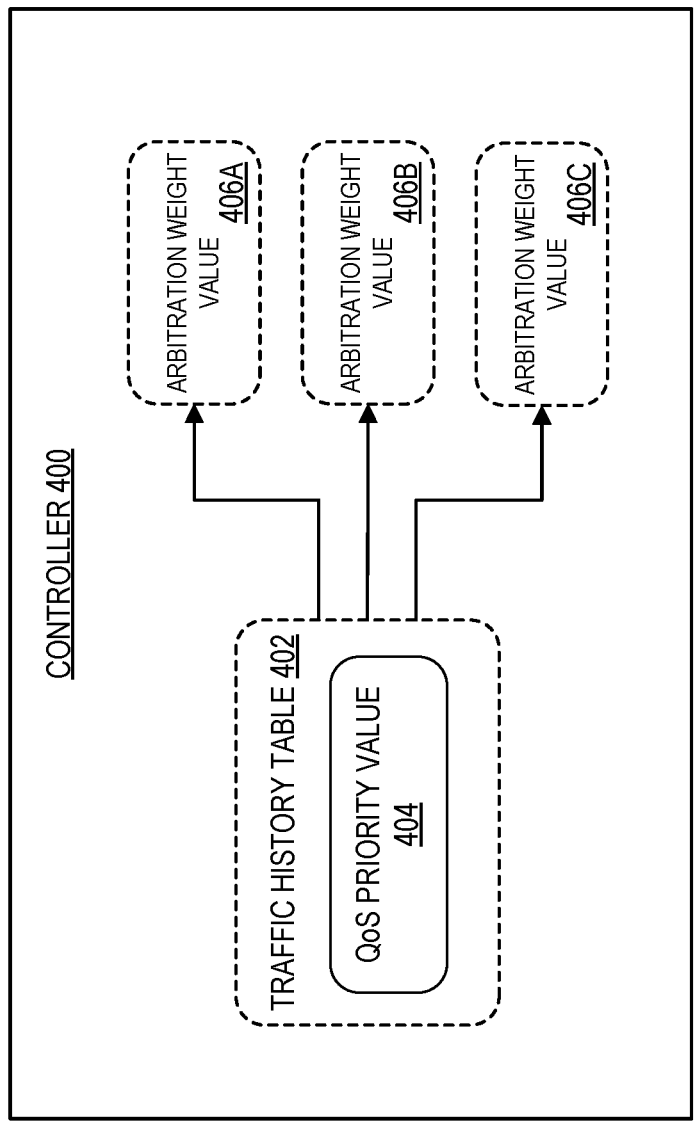
FIG. 4 schematically illustrates calculation of arbitration weight values based on traffic parameters in a traffic history table.

Returning briefly to FIG. 2, at 206, method 200 includes calculating arbitration weights for the two or more input ports based at least in part on the traffic parameters recorded in the traffic history table, including the QoS priority value. As discussed above, in some examples, this is done for a WRR arbitration process. Calculation of arbitration weight values is schematically illustrated with respect to FIG. 4, showing another example controller 400 of a network router. As shown, controller 400 maintains a traffic history table 402, storing various traffic parameters for two or more network packets received by the network router. These traffic parameters include a QoS priority value 404 for a received network packet. Based at least in part on the traffic parameters in the traffic history table, the controller calculates arbitration weight values 406A-406C to be applied to the traffic streams being received over different input ports of the network router.

The specific manner in which the arbitration weight values are calculated may vary depending on the implementation. In one example, an arbitration weight value calculated for a particular input port is proportional to the QoS priority value for a network packet received over the input port. In other words, if the QoS priority value is relatively higher, then the arbitration weight value will similarly be higher, such that the traffic stream received over that input port is prioritized.

More particularly, in one example scenario, calculating the arbitration weight value for the input port includes calculating an initial arbitration weight value based at least in part on the traffic parameters for the network packet. For instance, the initial arbitration weight value may be calculated based on the source address, destination address, and/or number of hops, as recorded in the traffic history table (e.g., as is shown in FIG. 3). This initial arbitration weight value may then be left-shifted by an amount proportional to the QoS priority value for the network packet. In this manner, relatively higher QoS priority values result in relatively higher increases to the arbitration weight value.

This approach is described by the following example pseudocode, which describes a process for calculating weights for routing network traffic through a router with multiple input ports, output ports, and virtual channels (VCs).

for o in range(numOutports):
  for v in range(numVC):
    for i in range(numInports):
      if(len(history [o][i][v]['ID'])>1):
        pshift=0
        if history [o][i][v]['priority']>0:
          pshift=<<history      [o][i][v]['priority']>shift amount>
        Weight [o][v][i]=f (history [o][i][v]['all info'])
          <<pshift In this approach, the outer loops iterate over all output ports (numOutports), virtual channels (numVC), and input ports (numInports). o, v, and i are variables representing the current output port, virtual channel, and input port, respectively. "if(len(history [o][i][v]['ID'])>1)" checks if the history for a given combination of output port, input port, and virtual channel includes more than one ID. pshift is initialized to 0. If the priority for the current port and channel combination is greater than 0, pshift is set to a specific shift amount based on the QoS level. This shift amount is a configured parameter. The final weight is obtained by left-shifting the calculated value by pshift. This essentially multiplies the weight by a power of two, depending on the value of pshift.

Figure 5A:
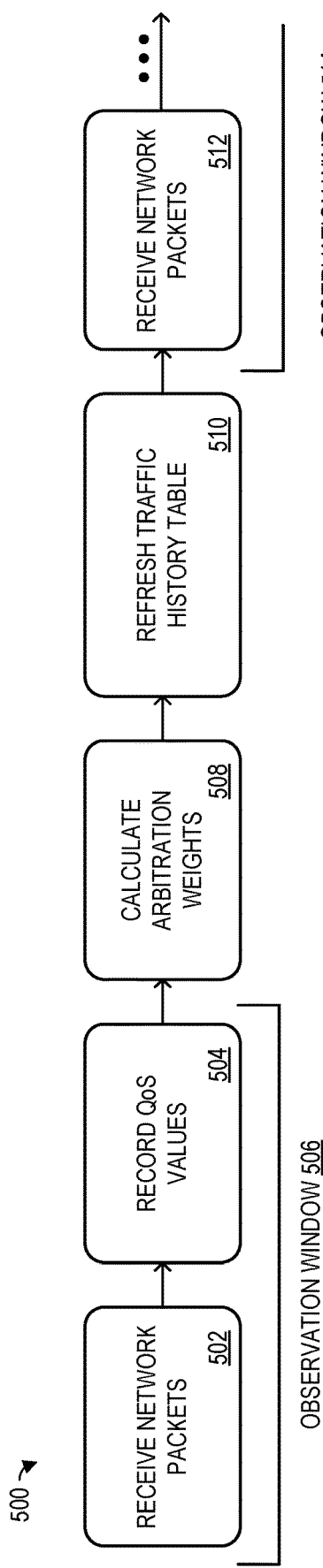
FIGS. 5A and 5B schematically illustrate calculation of arbitration weight values based on network packets received during an observation window.

As discussed above, network packets are received by the network router during an observation window. In some examples, the arbitration weights for the input ports are then calculated after completion of the observation window, based on the traffic parameters recorded in the traffic history table. This is schematically illustrated with respect to FIG. 5A, showing an example process 500 for calculating arbitration weight values. As shown, the process includes receiving network packets at 502, and recording one or more QoS priority values for the network packets at 504. These steps occur during an observation window 506. After completion of the observation window, arbitration weights are calculated at 508. In this case, the traffic history table is refreshed after completion of the observation window at 510—e.g., the traffic parameters recorded during observation window 506 are erased from the traffic history table. However, it will be understood that, in some examples, at least some information in the traffic history table may be retained for the next observation window. Next, the network router receives additional network packets at 512, during a subsequent observation window 514. From here, the process may repeat for any number of additional cycles, as data traffic continues to arrive.

Additionally, or alternatively, in some cases, arbitration weight values may be calculated during an observation window. In some cases, this occurs based at least in part on the QoS priority value for a network packet exceeding an update threshold, causing arbitration weights for the input ports to be calculated prior to completion of the observation window. Any suitable value may be used for the update threshold. As one non-limiting example, the update threshold may be equal to a highest QoS priority value previously detected during the observation window.

Figure 5B:
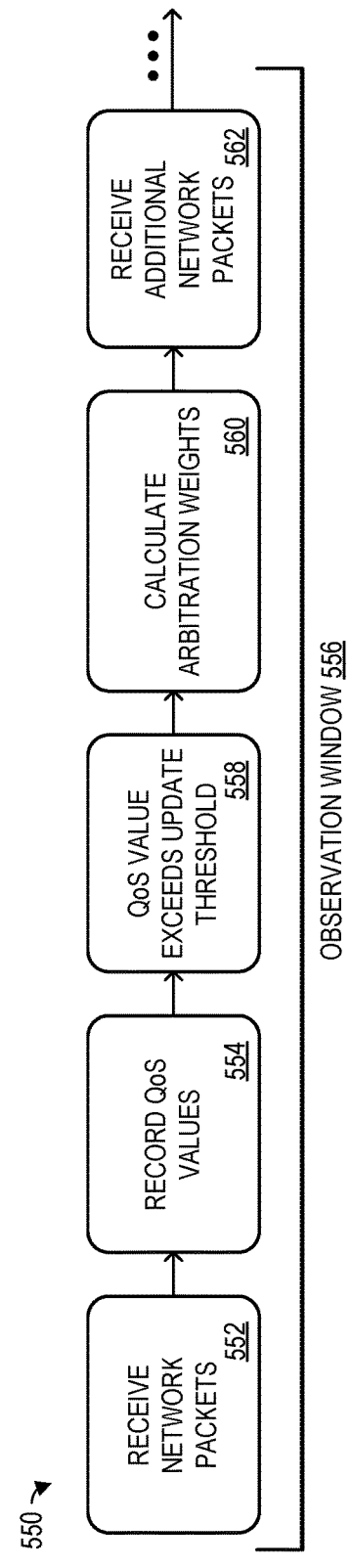

This approach is illustrated with respect to FIG. 5B, showing another example process 550 for calculating arbitration weight values. As shown, the network router receives network packets at 502, and records QoS priority values for the network packets in a traffic history table at 554. These each occur during an observation window 556. In this case, however, the controller detects that a QoS value of a received network packet exceeds an update threshold at 558. The controller responds by calculating a set of arbitration weight values 560, while continuing to receive additional network packets at 562. Notably, this is still prior to completion of observation window 556. This may beneficially reduce the weight update latency as high priority requests are received, reducing latency of the data stream. In some cases, once the observation window is complete, the arbitration weight values are then calculated again—e.g., based on traffic parameters for any additional network packets received before the observation window ended.

Returning briefly to FIG. 2, at 208, method 200 includes sequentially transmitting each of the two or more network packets over an output port of the network router according to the arbitration weight values. For instance, to use the example of FIG. 1, the network packets 104A-104C may be sequentially transmitted via output port 108 of the network router according to the arbitration weight values calculated for the input ports of the network router.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 6:
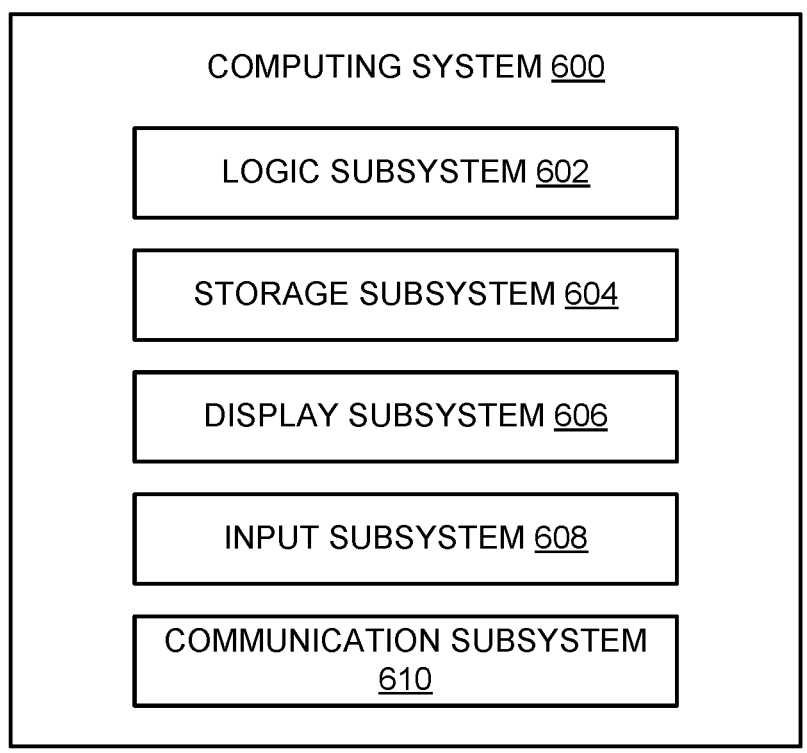
FIG. 6 schematically shows an example computing system.

FIG. 6 schematically shows a simplified representation of a computing system 600 configured to provide any to all of the compute functionality described herein. Computing system 600 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 600 includes a logic subsystem 602 and a storage subsystem 604. Computing system 600 may optionally include a display subsystem 606, input subsystem 608, communication subsystem 610, and/or other subsystems not shown in FIG. 6.

Logic subsystem 602 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 604 includes one or more physical devices configured to temporarily and/or permanently hold computer information such as data and instructions executable by the logic subsystem. When the storage subsystem includes two or more devices, the devices may be collocated and/or remotely located. Storage subsystem 604 may include volatile, nonvolatile, dynamic, static, read/write, read-only, random-access, sequential-access, location-addressable, file-addressable, and/or content-addressable devices. Storage subsystem 604 may include removable and/or built-in devices. When the logic subsystem executes instructions, the state of storage subsystem 604 may be transformed—e.g., to hold different data.

Aspects of logic subsystem 602 and storage subsystem 604 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 606 may be used to present a visual representation of data held by storage subsystem 604. This visual representation may take the form of a graphical user interface (GUI). Display subsystem 606 may include one or more display devices utilizing virtually any type of technology. In some implementations, display subsystem may include one or more virtual-, augmented-, or mixed reality displays.

When included, input subsystem 608 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 610 may be configured to communicatively couple computing system 600 with one or more other computing devices. Communication subsystem 610 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method for network traffic arbitration comprises: at a network router, receiving two or more network packets over two or more input ports; during an observation window, recording traffic parameters of the two or more network packets in a traffic history table, the traffic parameters including a Quality-of-Service (QoS) priority value for a network packet of the two or more network packets; and based at least in part on the traffic parameters recorded in the traffic history table, including the QoS priority value, calculating arbitration weights for each of the two or more input ports for a weighted round robin arbitration process. In this example or any other example, the method further comprises sequentially transmitting each of the two or more network packets over an output port of the network router according to the arbitration weight values. In this example or any other example, the network packet is received over an input port of the two or more input ports, and wherein an arbitration weight value calculated for the input port is proportional to the QoS priority value for the network packet. In this example or any other example, calculating the arbitration weight value for the input port includes calculating an initial arbitration weight value based at least in part on the traffic parameters for the network packet, and then left-shifting the initial arbitration weight value by an amount proportional to the QoS priority value for the network packet. In this example or any other example, the arbitration weights for each of the two or more input ports are calculated after completion of the observation window. In this example or any other example, based at least in part on the QoS priority value for the network packet exceeding an update threshold, the arbitration weights for each of the two or more input ports are calculated prior to completion of the observation window. In this example or any other example, the update threshold is equal to a highest QoS priority value previously detected during the observation window. In this example or any other example, the method further comprises refreshing the traffic history table after completion of the observation window. In this example or any other example, the traffic parameters stored in the traffic history table further include a source address for each network packet, a destination address for each network packet, and a number of network hops traveled by the network packet.

In an example, a network router comprises: a controller configured to: receive two or more network packets over two or more input ports; during an observation window, record traffic parameters of the two or more network packets in a traffic history table, the traffic parameters including a Quality-of-Service (QOS) priority value for a network packet of the two or more network packets; and based at least in part on the traffic parameters recorded in the traffic history table, including the QoS priority value, calculate arbitration weights for each of the two or more input ports for a weighted round robin arbitration process. In this example or any other example, the controller is further configured to sequentially transmit each of the two or more network packets over an output port of the network router according to the arbitration weight values. In this example or any other example, the network packet is received over an input port of the two or more input ports, and wherein an arbitration weight value calculated for the input port is proportional to the QoS priority value for the network packet. In this example or any other example, calculating the arbitration weight value for the input port includes calculating an initial arbitration weight value based at least in part on the traffic parameters for the network packet, and then left-shifting the initial arbitration weight value by an amount proportional to the QoS priority value for the network packet. In this example or any other example, the arbitration weights for each of the two or more input ports are calculated after completion of the observation window. In this example or any other example, based at least in part on the QoS priority value for the network packet exceeding an update threshold, the arbitration weights for each of the two or more input ports are calculated prior to completion of the observation window. In this example or any other example, the update threshold is equal to a highest QoS priority value previously detected during the observation window. In this example or any other example, the controller is further configured to refresh the traffic history table after completion of the observation window. In this example or any other example, the traffic parameters stored in the traffic history table further include a source address for each network packet, a destination address for each network packet, and a number of network hops traveled by the network packet.

In an example, a method for network traffic arbitration comprises: at a network router, receiving two or more network packets over two or more input ports; during an observation window, recording traffic parameters of the two or more network packets in a traffic history table, the traffic parameters including a Quality-of-Service (QoS) priority value for a network packet of the two or more network packets; based at least in part on the traffic parameters recorded in the traffic history table, including the QoS priority value, calculating arbitration weights for each of the two or more input ports for a weighted round robin arbitration process, wherein an arbitration weight for the network packet is proportional to the QoS priority value of the network packet; and sequentially transmitting each of the two or more network packets over an output port of the network router according to the arbitration weight values. In this example or any other example, calculating the arbitration weight value for the input port includes calculating an initial arbitration weight value based at least in part on the traffic parameters for the network packet, and then left-shifting the initial arbitration weight value by an amount proportional to the QoS priority value for the network packet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for network traffic arbitration, the method comprising:
   at a network router, receiving two or more network packets over two or more input ports;
   during an observation window, recording traffic parameters of the two or more network packets in a traffic history table, the traffic parameters including a Quality-of-Service (QOS) priority value for a network packet of the two or more network packets; and
   based at least in part on the traffic parameters recorded in the traffic history table, including the QoS priority value, calculating arbitration weights for each of the two or more input ports for a weighted round robin arbitration process, wherein the QoS priority value for the network packet exceeds an update threshold, and the arbitration weights for each of the two or more input ports are calculated prior to completion of the observation window responsive to the QoS priority value exceeding the update threshold.

2. The method of claim 1, further comprising sequentially transmitting each of the two or more network packets over an output port of the network router according to the arbitration weight values.

3. The method of claim 1, wherein the network packet is received over an input port of the two or more input ports, and wherein an arbitration weight value calculated for the input port is proportional to the QoS priority value for the network packet.

4. The method of claim 1, wherein calculating the arbitration weight value for the input port includes calculating an initial arbitration weight value based at least in part on the traffic parameters for the network packet, and then left-shifting the initial arbitration weight value by an amount proportional to the QoS priority value for the network packet.

5. The method of claim 1, wherein the update threshold is equal to a highest QoS priority value previously detected during the observation window.

6. The method of claim 1, further comprising refreshing the traffic history table after completion of the observation window.

7. The method of claim 1, wherein the traffic parameters stored in the traffic history table further include a source address for each network packet, a destination address for each network packet, and a number of network hops traveled by the network packet.

8. The method of claim 1, wherein the arbitration weights for each of the two or more input ports are used to determine an order or sequence with which the two or more network packets will be transmitted over an output port as part of the weighted round robin arbitration process.

9. The method of claim 1, wherein a length of the observation window is dynamically configurable.

10. A network router, comprising:
    a controller configured to:
    receive two or more network packets over two or more input ports;
    during an observation window, record traffic parameters of the two or more network packets in a traffic history table, the traffic parameters including a Quality-of-Service (QOS) priority value for a network packet of the two or more network packets; and
    based at least in part on the traffic parameters recorded in the traffic history table, including the QoS priority value, calculate arbitration weights for each of the two or more input ports for a weighted round robin arbitration process, wherein the arbitration weights for each of the two or more input ports are calculated prior to completion of the observation window responsive to the QoS priority value exceeding an update threshold.

11. The network router of claim 10, wherein the controller is further configured to sequentially transmit each of the two or more network packets over an output port of the network router according to the arbitration weight values.

12. The network router of claim 10, wherein the network packet is received over an input port of the two or more input ports, and wherein an arbitration weight value calculated for the input port is proportional to the QOS priority value for the network packet.

13. The network router of claim 10, wherein calculating the arbitration weight value for the input port includes calculating an initial arbitration weight value based at least in part on the traffic parameters for the network packet, and then left-shifting the initial arbitration weight value by an amount proportional to the QoS priority value for the network packet.

14. The network router of claim 10, wherein the update threshold is equal to a highest QoS priority value previously detected during the observation window.

15. The network router of claim 10, wherein the controller is further configured to refresh the traffic history table after completion of the observation window.

16. The network router of claim 10, wherein the traffic parameters stored in the traffic history table further include a source address for each network packet, a destination address for each network packet, and a number of network hops traveled by the network packet.

17. The network router of claim 10, wherein the arbitration weights for each of the two or more input ports are used to determine an order or sequence with which the two or more network packets will be transmitted over an output port as part of the weighted round robin arbitration process.

18. The network router of claim 10, wherein a length of the observation window is dynamically configurable.

19. A method for network traffic arbitration, the method comprising:
    at a network router, receiving two or more network packets over two or more input ports;
    during an observation window, recording traffic parameters of the two or more network packets in a traffic history table, the traffic parameters including a Quality-of-Service (QOS) priority value for a network packet of the two or more network packets;
    based at least in part on the traffic parameters recorded in the traffic history table, including the QoS priority value, calculating arbitration weights for each of the two or more input ports for a weighted round robin arbitration process, wherein an arbitration weight for the network packet is proportional to the QoS priority value of the network packet, and wherein the QoS priority value for the network packet exceeds an update threshold, and the arbitration weights for each of the two or more input ports are calculated prior to completion of the observation window responsive to the QoS priority value exceeding the update threshold; and sequentially transmitting each of the two or more network packets over an output port of the network router according to the arbitration weight values.

20. The method of claim 19, wherein calculating the arbitration weight value for the input port includes calculating an initial arbitration weight value based at least in part on the traffic parameters for the network packet, and then left-shifting the initial arbitration weight value by an amount proportional to the QoS priority value for the network packet.

* * * * *